(12) United States Patent
Mitteltstadt

(10) Patent No.: US 11,217,980 B1
(45) Date of Patent: Jan. 4, 2022

(54) CENTER LINE LOAD CENTER

(71) Applicant: Schneider Electric USA, Inc., Andover, MA (US)

(72) Inventor: Chad R. Mitteltstadt, Cedar Rapids, IA (US)

(73) Assignee: Schneider Electric USA, Inc., Boston, MA (US)

( * ) Notice: Subject to any disclaimer, the term of this patent is extended or adjusted under 35 U.S.C. 154(b) by 0 days.

(21) Appl. No.: 17/130,241

(22) Filed: Dec. 22, 2020

(51) Int. Cl.
*H02G 5/06* (2006.01)
*H01B 7/02* (2006.01)

(52) U.S. Cl.
CPC .................. *H02G 5/06* (2013.01); *H01B 7/02* (2013.01)

(58) Field of Classification Search
CPC ........ H02B 1/06; H02B 1/22; H02B 13/0352; H01H 1/5844; H01H 1/5866; H01H 2011/0037; H01H 2033/6623; H01H 2033/6668; H01H 31/003; H01H 33/022; H01H 33/66; H01H 71/08; H01H 73/08; H01H 31/32; H01R 13/447; H01R 13/506; H01R 13/6691; H01R 25/162; H01R 9/2458; H01R 9/28; H02G 5/08
USPC .......................................... 174/99 B; 361/62
See application file for complete search history.

(56) References Cited

U.S. PATENT DOCUMENTS

| | | | | |
|---|---|---|---|---|
| 2,986,676 A * | 5/1961 | Edmunds | ............... | H02B 1/056 361/636 |
| 2,997,627 A * | 8/1961 | Ellegood | .................. | H02B 1/21 361/614 |
| 3,192,446 A * | 6/1965 | Meacham | ............... | H02B 1/056 361/634 |
| 3,273,022 A * | 9/1966 | McRoberts | ............ | H01H 85/20 361/646 |
| 3,349,292 A * | 10/1967 | Meacham | ............... | H02B 1/056 361/648 |
| 3,371,251 A * | 2/1968 | Speck | ..................... | H02B 1/056 361/650 |
| 4,720,769 A * | 1/1988 | Raabe | ....................... | H02B 1/42 361/634 |
| 5,229,922 A * | 7/1993 | Muramatsu | ............ | H05K 7/026 361/648 |
| 5,343,356 A * | 8/1994 | Hancock | ................ | H02B 1/056 174/68.2 |
| 5,414,590 A * | 5/1995 | Tajali | ........................ | H02B 1/03 324/156 |
| 6,002,580 A * | 12/1999 | LeVantine | .............. | H02B 1/056 361/634 |
| 6,122,160 A * | 9/2000 | Hannula | ................ | H02B 1/056 174/59 |

(Continued)

*Primary Examiner* — William H. Mayo, III
*Assistant Examiner* — Krystal Robinson
(74) *Attorney, Agent, or Firm* — Locke Lord LLP

(57) ABSTRACT

A power line rail is provided for a center line load center. The line rail includes a bus bar assembly for supplying electrical energy, and an insulation enclosure for the bus bar assembly. The bus bar assembly includes separate first and second line buses. The first and second line bus includes two branching first bus bars and two branching second bus bars respectively. The first and second bus bars are separated from each other in an X-formation to provide first and second pairs of separated bus bars. The insulation enclosure includes first and second sets of windows on opposite sides of the enclosure through which to connect to the first and second pairs of bus bars respectively in the enclosure.

18 Claims, 13 Drawing Sheets

(56) References Cited

U.S. PATENT DOCUMENTS

| | | | | |
|---|---|---|---|---|
| 6,530,811 B1* | 3/2003 | Padulo | .................... | H01H 73/08 |
| | | | | 361/634 |
| 6,672,914 B1* | 1/2004 | Claprood | ............... | H01R 25/14 |
| | | | | 439/876 |
| 7,256,984 B2* | 8/2007 | Kim | ..................... | H05K 7/1457 |
| | | | | 174/68.2 |
| 7,889,480 B2* | 2/2011 | Latham | .................. | H02B 1/056 |
| | | | | 361/634 |
| 8,305,739 B2* | 11/2012 | Dozier | .................. | H02B 1/056 |
| | | | | 361/627 |
| 8,422,203 B2* | 4/2013 | Knight | .................... | H04Q 1/03 |
| | | | | 361/630 |
| 9,460,879 B2* | 10/2016 | Mills | ....................... | H01H 9/28 |
| 2005/0012578 A1* | 1/2005 | Afshari | ................... | H02B 1/06 |
| | | | | 335/202 |
| 2005/0213289 A1* | 9/2005 | M'Sadoques | .......... | H02B 1/056 |
| | | | | 361/624 |
| 2010/0319954 A1* | 12/2010 | Ramsey | ................... | H02G 5/08 |
| | | | | 174/68.2 |
| 2011/0304958 A1* | 12/2011 | Dozier | .................... | H02B 1/32 |
| | | | | 361/634 |

* cited by examiner

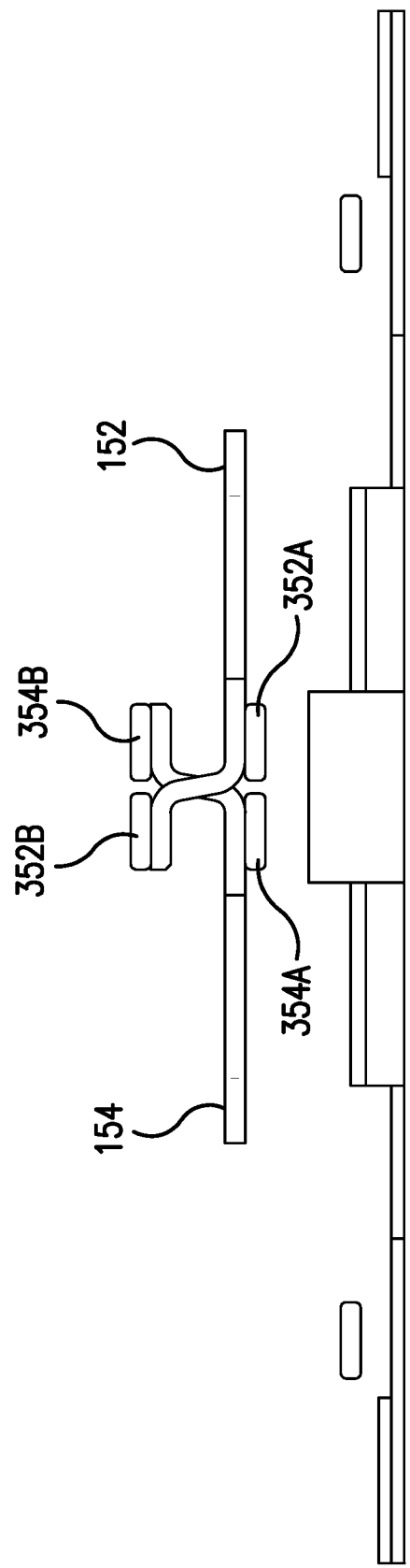

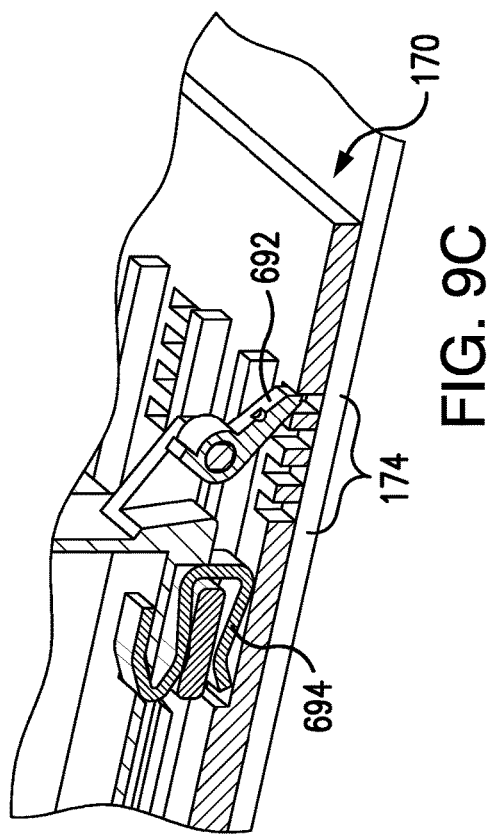
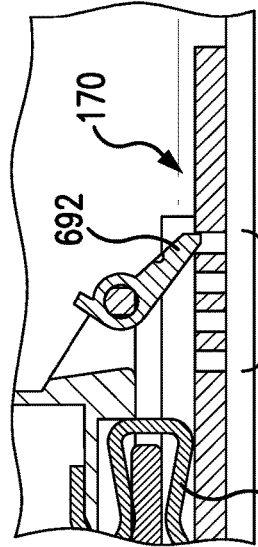
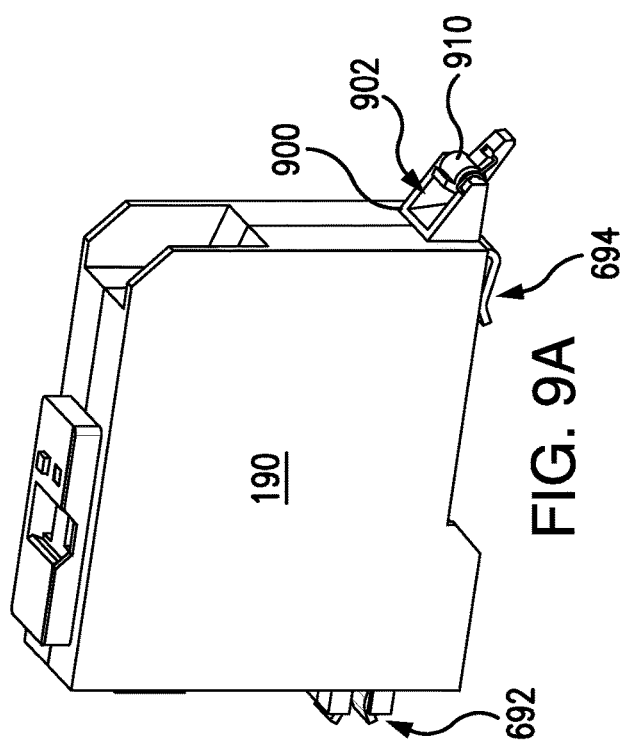
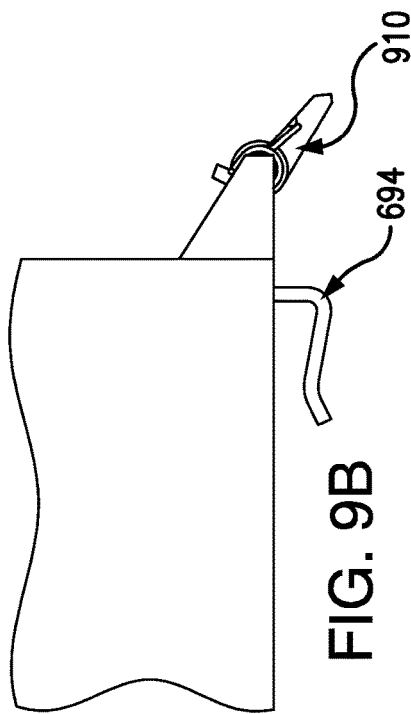
FIG. 9C
FIG. 9D
FIG. 9A
FIG. 9B

US 11,217,980 B1

CENTER LINE LOAD CENTER

TECHNICAL FIELD

The present disclosure relates to an electrical distribution system, and more particularly, to a power line rail assembly for an electrical distribution system such as a load center.

BACKGROUND

An electrical panel can include live conductors, such as a power line bus and individual connection points on the bus which are connectable to electrical devices, such as circuit breakers and other equipment, for each branch circuit conductor. The branch circuit conductors supply electricity to the various loads such as within a residence.

SUMMARY

A power line rail assembly is provided for an electrical distribution system. The power line rail assembly includes a line bus bar assembly for supplying electrical energy, and an enclosure for housing conductors of the line bus bar assembly. The line bus bar assembly includes conductors such as a first line bus and a separate second line bus. The first line bus includes two branching first bus bars, and the second line bus includes two branching second bus bars. The first and second bus bars are separated from each other in an X-formation along a length of the line bus bar assembly to provide first and second pairs of separated bus bars. The first pair of separated bus bars has one of the first bus bars positioned above one of the second bus bars. The second pair of separated bus bars has the other of the first bus bars positioned below the other of the second bus bars. The enclosure includes first and second sets of windows on opposite sides of the enclosure through which to connect to the first and second pairs of bus bars respectively in the enclosure. Each of the first and second sets of windows includes a top row of windows and a bottom row of windows. The top and bottom rows are arranged along a length of the enclosure. The top row of windows of the first set is for connecting to one of the first and second bus bars of the first pair of separated bus bars; the bottom row of windows of the first set is for connecting to the other of the first and second bus bars of the first pair of separated bus bars. The top row of windows of the second set is for connecting to one of the first and second bus bars of the second pair of separated bus bars; the bottom row of windows of the second set is for connecting to the other of the first and second bus bars of the second pair of separated bus bars.

In various embodiments, the branching first and second bus bars each have an elongated portion which extends along a direction of a length of the enclosure and upon which to connect an electrical connector of a branch device through a window from the first or second set. The elongated portions of the two branching first bus bars can be separated diagonally from each other along a length of the enclosure, and the elongated portions of the two branching second bus bars can be separated diagonally from each other along a length of the enclosure. The elongated portion of the first bus bar of the first pair of bus bars can be substantially parallel to the second bus bar of the second pair of bus bars, and the elongated portion of the first bus bar of the second pair of bus bars can be substantially parallel to the second bus bar of the first pair of bus bars.

The line bus bar assembly also can have a first end and a second opposite end, the two branching first bus bars can branch out from the first end of the line bus bar assembly, and the two branching second bus bars can branch out from the second end of the line bus bar assembly. Furthermore, the first and second line buses can supply voltage at first and second voltages respectively, the line bus bar assembly being configured to supply voltage substantially equal to the sum of the first and second voltages when a 2-pole branch device has a first pole connected to the first line bus and a second pole connected to the second line bus, from a window from one of the top and bottom rows and a window from the other of the top and bottom rows respectively on the first or second set.

The top and bottom rows of each of the first and second sets on respective sides of the enclosure can have their windows spaced apart according to a pole-spacing of branch devices connectable thereto. The first and second line buses can be electrically isolated from each other by dielectric or insulation walls in the enclosure. The windows of the enclosure can be finger-safe windows.

In a further embodiment, a load center can include two neutral buses, and the power line rail assembly which is arranged between the two neutral buses. The load center can further include a plurality of tracks each having a guide rail for guiding a branch device to connect to the first or second line bus through a window of a corresponding top and bottom window pair from the top and bottom rows of windows along the enclosure, the tracks and respective window pairs being spaced apart along the enclosure according to pole-spacing of branch devices connectable thereto.

The load center can further include at least one branch device having a horizontal line connector (commonly called a jaw) for connecting to one of the first and second bus bars through a window from a top and bottom window pair from the top and bottom rows of windows along the enclosure. The at least one branch device can further include a horizontal neutral connector, the at least one branch device configured to connect or disconnect the neutral and line connectors to or from the neutral bus bar and one of the first and second bus bars, respectively, when racking in or racking out the at least one branch device along a track from the plurality of tracks. The at least one branch device can further include a spring-loaded pawl (or lever) for engaging a tooth or slot on a track from the plurality of tracks to lock the at least one branch device between the power line rail assembly and the track after the at least one branch device is connected to the power line rail assembly in a racked-in position.

In various embodiments, the enclosure of the power line rail assembly can have a substantially rectangular shape with the first and second sets of windows being located along a length of the enclosure on opposite sides thereof. The load center can further include an electronic rail configured to enable communications for one or more branch devices connected to branch circuits powered by the first and/or second bus bars, the electronic rail being connected on top of the enclosure of the power line rail assembly. The at least one branch device can also include a communication connector for connecting to a communication port of the electronic rail in a horizontal direction.

In a further embodiment, the load center can include: an electronic rail configured to enable communications for one or more branch devices connected to branch circuits powered by the first and/or second bus bars, the electronic rail being connected on top of the enclosure of the power line rail assembly, the electronic rail including a row of communication ports arranged along a length of the electronic rail; at least one branch device having a horizontal line connector for connecting to one of the first and second bus bars through a window from a top and bottom window pair from the top and bottom rows of windows along the enclosure of the power line rail assembly, and a communication connector for connecting to a communication port from the row of communication ports on the electronic rail; and a plurality of tracks each having a guide rail for guiding the at least one branch device to connect to the first or second line bus through a window of a corresponding top and bottom window pair from the top and bottom rows of windows along the enclosure of the power line rail assembly and to connect to a communication port from the row of communication ports on the electronic rail. The tracks, respective window pairs and communication ports are spaced apart along the enclosure according to pole-spacing of branch devices connectable thereto.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

FIGS. 9A, 9B, 9C and 9D show different views of a one-pole branch device with a ratchet lock, in accordance with an embodiment.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
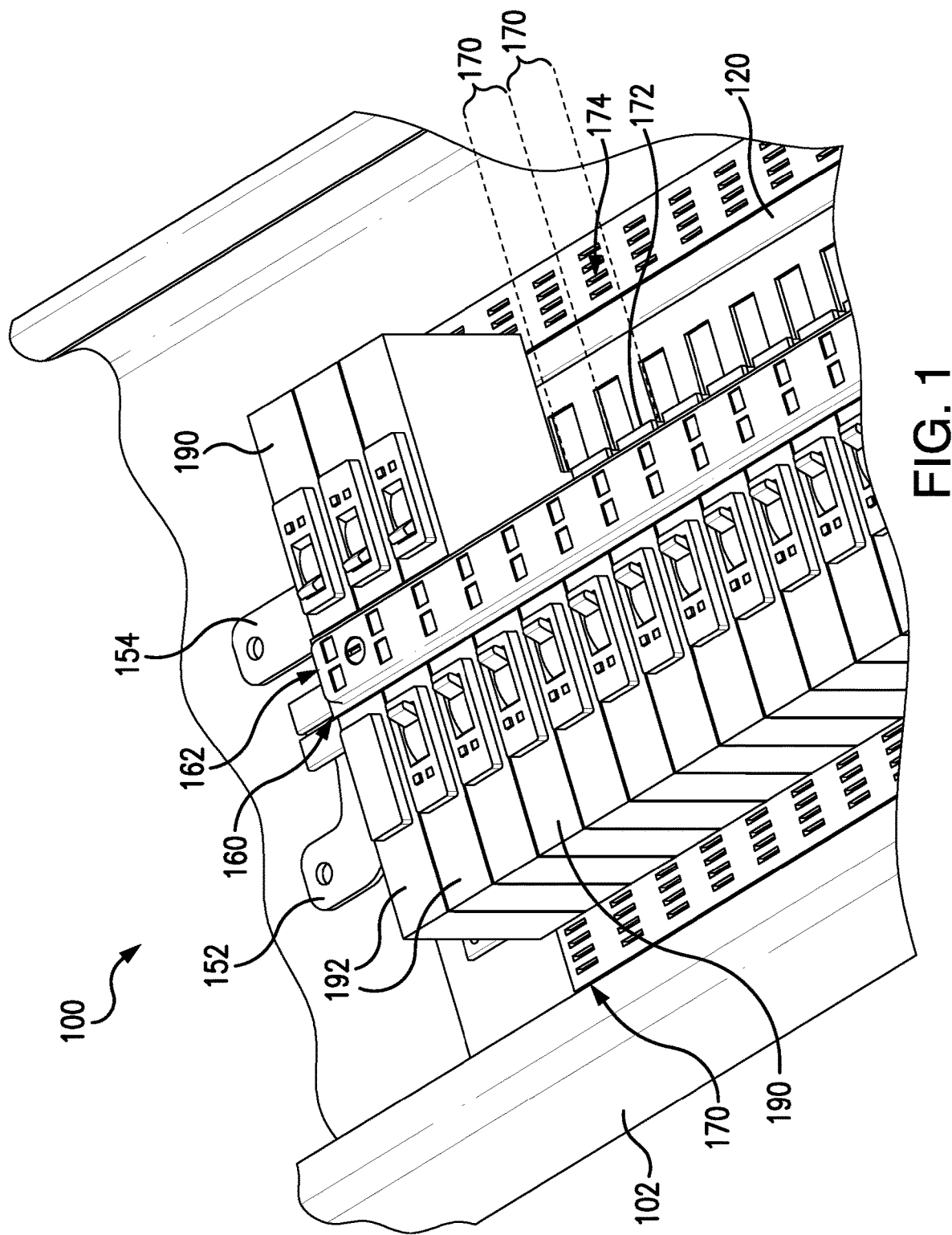
FIG. 1 shows a portion of an example electrical distribution system, such as an example load center, with a front cover removed, in accordance with an embodiment.

The present disclosure is directed to a power line rail assembly (or "power line rail") for an electrical distribution system, such as a center line load center or panelboard (hereinafter "load center"), which employs two separate line buses each having two branching bus bars. The branching bus bars of the line buses are configured in an X-formation or -structure (hereinafter "X-formation") to supply line power to one or more branch devices connected thereto from either sides (e.g., Left side or Right side) of the electrical distribution system. The branch devices can include circuit breakers, switches or other protective or monitoring branch devices connectable at the origin of a branch circuit(s).

The power line rail assembly also can include an enclosure, arranged along a center of the electrical distribution system, for housing the bus bars of the line buses. The enclosure can include a plurality of windows (e.g., windows, openings, slots, etc.) on opposite sides of the enclosure to allow connection of branch devices to the two line buses therein, from either sides of the electrical distribution system. The windows can be spaced apart along the enclosure according to the pole-spacing of the branch devices connectable thereto. The electrical distribution system can further include a track system having a plurality of tracks, on opposite sides of the enclosure, for guiding each pole of a branch device to connect to one of the line buses through a respective window on the enclosure. In this way, the windows and tracks can be arranged on both sides of the electrical distribution system according to the pole-spacing of branch devices connectable thereto, thereby providing a track and associated windows for each pole of a device for connection to a conductor of either of the two line buses. For example, the spacing for the tracks and windows are configured to match the spacing of a pole of a connectable branch device (e.g., a width or approximate width of branch device).

The X-formation of the bus bars of the line buses allows balanced current loading of two line buses (e.g., Line 1 and Line 2) even when using single-pole (also referred to as "one-pole") branch device since Right-side branch devices may access one line and Left-side branch devices may access the other line. Such a formation also allows a single-pole branch device to access both lines if desired (e.g., a voltage monitoring device, a surge protective device, etc.). The two-dimensional power bus geometry can significantly simplify manufacturing. For example, no additional cutting or forming of bus material may be required. It can also minimizes "off all" wasted raw stock due to cutting. Furthermore, the power line rail is able to stand alone as a subassembly. It can house all the necessary parts to create the insulation and conductors to deliver power to every branch device.

A ratchet locking system can also be provided to lock the branch device to the load center when the branch device is connected to the power line rail assembly. The branch device can include a spring-loaded pawl for engaging a teeth/slot on the track. For example, the track can include a track T slot and a dovetail rail to prevent device movement in all directions except one direction, and then a ratchet can take away that final direction of movement. The track and pawl together can create the ratchet function. The ratchet will "lock" the branch device in an installed position, when the branch device is connected to the power line rail assembly along a track of the load center and the pawl of the branch device is engaged to a tooth/slot on the track. To remove or uninstall the branch device, a screwdriver tool can be used to release the ratchet using the teeth/slots on the track when the pawl is released from the track. Such a lock configuration can prevent accidental device removal, and can facilitate rack in and rack out of branch devices along the tracks of the load center.

In various embodiments, an electronic rail assembly (also referred to as "electronic rail") can be provided, which is connectable over the enclosure of the power line rail assembly. The electronic rail subassembly can include communication components, such as processor(s), communication line(s), connector(s)/interface(s) for branch devices, wireline/wireless transceiver(s), etc. which are housed in a housing, and can stand alone as a subassembly or unit. For example, the electronic rail assembly can house all the necessary parts to create the insulation, PCBAs, and connectors to centrally connect to branch devices. The electronic rail assembly can connect to the cloud for electronic purposes (e.g., monitoring, load control, firmware upgrades, etc.), can also provide a user interface (UI) to users since it can be configured to protrude or extend through a panel cover of a load center. The electronic rail assembly can sit on top of the power bus rail assembly, and can be removed and replaced easily (e.g., when malfunctioning) without a major teardown of the panel. The electronic rail assembly can provide high-speed communication link between devices, like the branch circuit breakers and a main circuit breaker, which can enable among other things, hybrid switching, main-to-branch circuit breaker interrupting coordination, load shedding, counterfeit protection handshake, and other coordinated operations by or between devices. The electronic rail assembly can also act as a circuit breaker electronic trip unit and do many of the protection calculations and decisions on fault protection. The electronic rail assembly also can deliver low voltage power to the branch device electronics to eliminate unique power supplies located inside each branch device. The various operations enabled by the electronic rail assembly can be controlled or performed by the processor(s) of the electronic rail assembly.

Furthermore, the connector configurations on the branch devices, such as circuit breakers, switches and so forth, can also be improved when using a two-line bus assembly with the X-formation described herein. For example, in some embodiments, the branch device can employ a connector, such as a jaw-type connector, with an jaw orientation that allows an easier and more secure installation direction having increased mechanical advantage for both installing and removing devices with the use of a tool (e.g., a screwdriver or the like). It can allow the power connection to be made in the same direction of movement as the electronic/communication connections of the electronic rail assembly.

In various embodiments, the power line rail assembly can be finger-safe, by combining the simple bus bars and the insulation enclosure (e.g., enclosure, case, housing, etc.). The enclosure can include small windows in the insulation enclosure, which are configured with a size or shape to allow a branch device connector (e.g., jaws or jaw connector or other electrical connector) to pass through, but nothing larger such as an average adult-sized finger.

Accordingly, the center line load center with the power line rail assembly and electronic rail of the present disclosure can provide communications connections to each or every pole space, as well as better branch device alignment, better branch device retention, easier installation and removal, fewer shock hazards, and can utilize lower cost and simpler bus bar designs.

These and other example features of the present disclosure will be described below in further detail below with reference to the figures.

Figure 2:
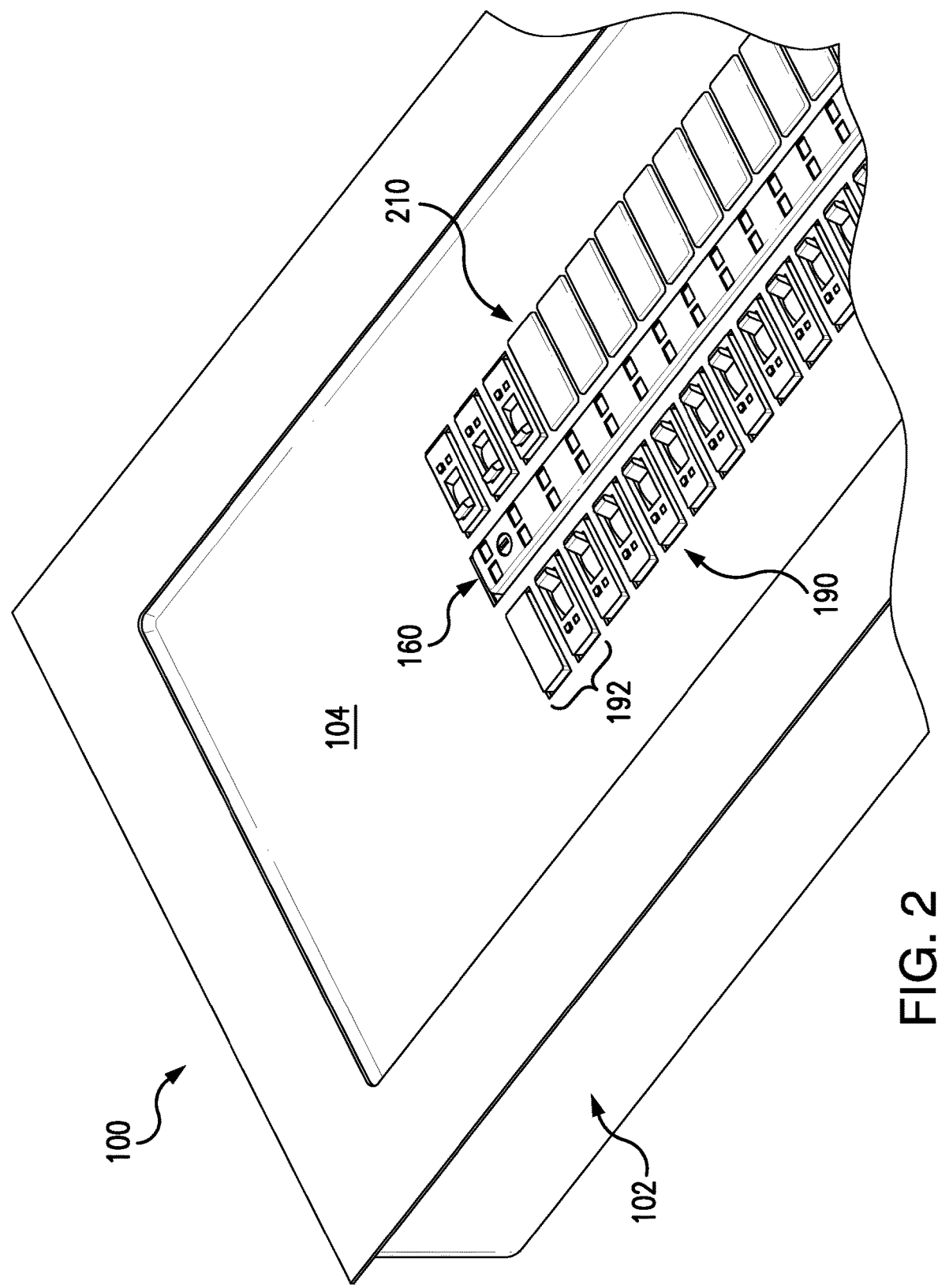
FIG. 2 shows a portion of the load center of FIG. 1, with the front cover, in accordance with an embodiment.

FIGS. 1 and 2 show a portion of an example electrical distribution system, such as an example load center 100 with a housing 102 without and with a front cover 104, respectively. As shown in FIG. 1, the housing 102 houses components of the load center 100 therein. The load center 100 includes two neutral buses 120 and a power line rail assembly 150, which extends along a center-line of the load center 100 between the two neutral buses 120. The power line rail assembly 150 includes two separate line buses, namely a first line bus 152 and a second line bus 154, which have conductors to supply power at the same or different voltages (e.g., 120V, 240V, etc.). The conductors of the power line rail assembly 150 can include two branching bus bars for each line bus 152, 154 and can be connected to receive power from a mains supply or other upstream power source. As will be described in greater detail below with respect to other figures, the power line rail assembly 150 has the bus bars of the line buses 152 and 154 arranged in an X-formation or -structure ("X-formation") to allow a branch device to be connected to the first line bus 152 or the second line bus 154 from either sides of a finger-safe enclosure of the power line rail assembly 150, such as from a Left side or Right side of the load center 100.

The load center 100 can include a track system having a plurality of tracks 170, on opposite sides of the power line rail assembly 150, for each pole of a branch device connectable thereto. Each track 170 can include a guide rail 172 for a pole of a branch device, and a plurality of teeth/slots of a ratchet lock system for locking the branch device when connected to a conductor of the power line rail assembly 150. As shown in FIG. 1, a plurality of branch devices, such as for example, circuit breakers (e.g., miniature circuit breakers (MCB), etc.), can be connected along the power line rail assembly 160. The branch devices can include for example a single-pole branch device 190, a two-pole branch device 192 and other branch devices, which are connected to the conductors of the power line rail assembly 150.

As further shown in FIG. 1, an electronic rail 160 is arranged on the power line rail assembly 150, and includes a housing 162 for housing the components of the electronic rail 160. The housing 162 is configured to fit or sit on top of the enclosure of the power line rail assembly 150. The electronic rail can be connected to the power line rail assembly 150 using one or more fasteners 162 (e.g., screws). The electronic rail 160 can include communication equipment through which communications may be conducted by or with devices connected thereto. The communication equipment of the electronic rail 160 can include transceiver(s) for conducting line or wireless communication, communication lines, device connectors/interfaces, a processor(s) for controlling the components and operations of the electronic rail 160 as well as other connected devices in the load center 100, which are housed in a housing 162 (e.g., housing, case, enclosure, etc.). The housing 162 can also include windows through which branch devices can be connected to the connectors/interfaces of the electronic rail 160 in order to conduct communications with other devices.

As shown in FIG. 2, when the front cover 104 of the load center housing 102 is closed, a part of the electronic rail 160 can extend through an opening on the cover 104. Such a configuration may be useful when employing wireless communication, since the wireless transceiver or its antennas may be arranged in a portion of the electronic rail that extends through the cover 104. A user interface may also be provided on the extended portion for the user to input commands or setting which can be used to control the operations of the load center and devices connected therein, including branch devices, main circuit breaker and so forth. Furthermore, a top portion of the circuit breakers 190 and 192 with their handles also extend through the housing 102 to enable user operation thereof, and filler plates 210 can be used to cover openings without branch devices.

Figure 3A:
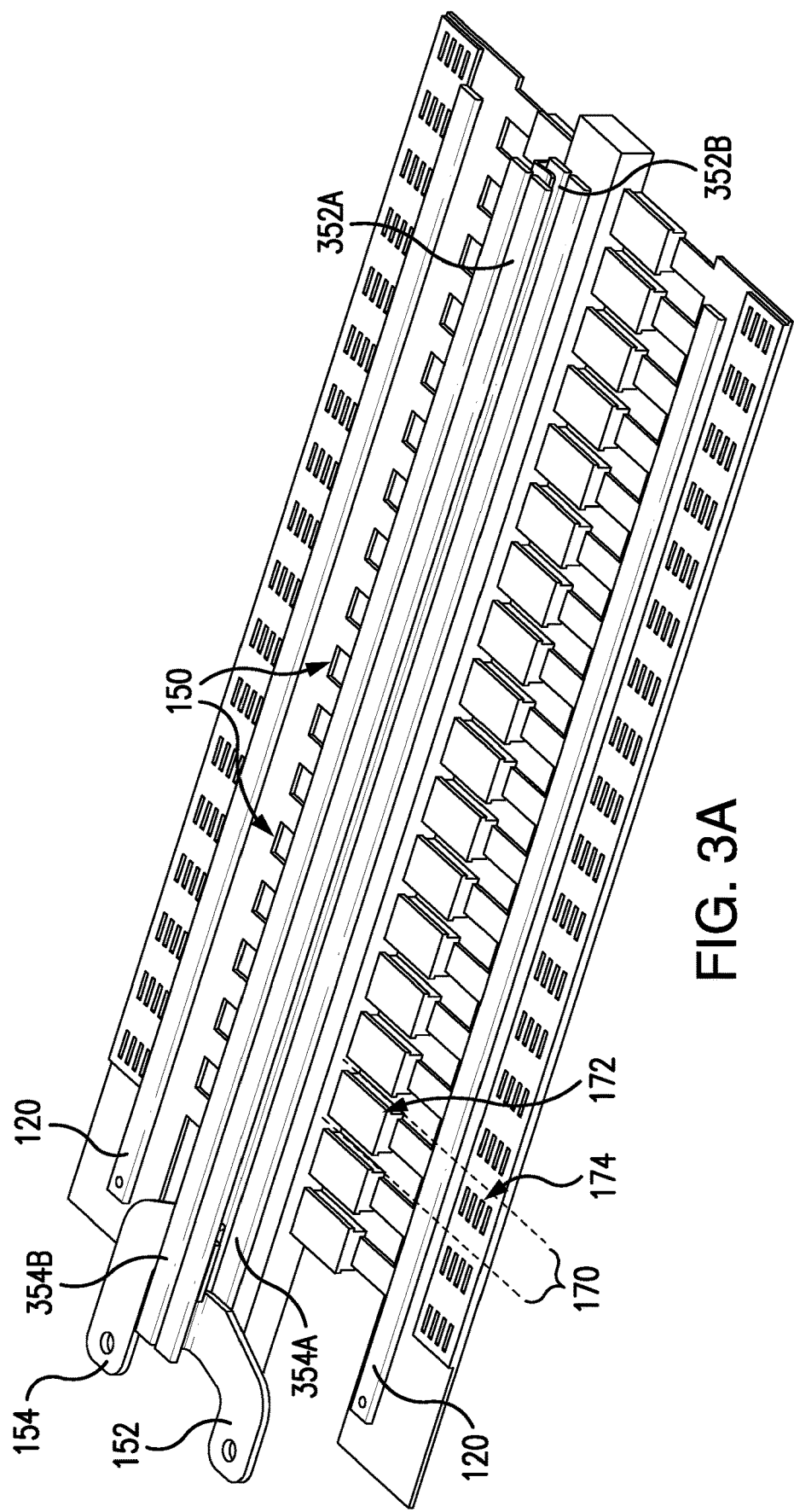
FIG. 3A shows a power rail bus assembly, without the enclosure, in which two line buses and their branching bus bars are arranged in an X-formation or -structure when viewed in cross section as shown in FIG. 3B, in accordance with an embodiment.
Figure 4:
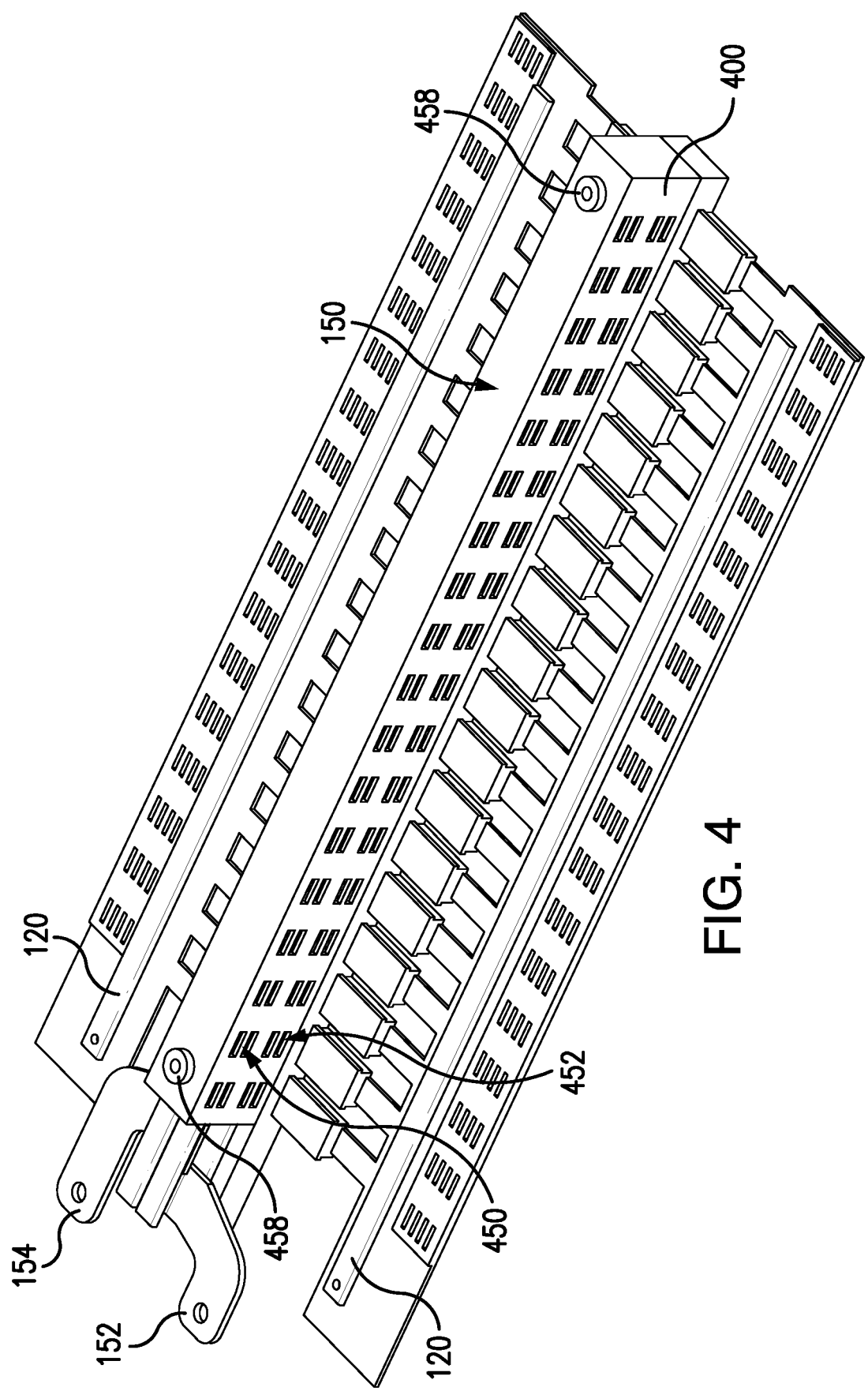
FIG. 4 shows a top perspective view of the power line rail assembly, neutral bus bars and plurality of tracks therebetween for branch devices, and their respective windows in accordance with an embodiment.

FIGS. 3A, 3B and 4 show an example of the power line rail assembly 150 of FIGS. 1 and 2, without and with an enclosure 400, which is arranged along a center line (or axis) of the load center 100 between two neutral bus lines (or bars) 120. As shown in FIG. 3, the power line rail assembly 150 includes a line bus assembly with conductors, such as the first line bus 152 and the second line bus 154, which can supply power at the same or different voltages to branch devices connected thereto. The first line bus 152 includes two branching first bus bars 352A and 352B, and the second line bus includes two branching second bus bars 354A and 354B. The bus bars 352A, 352B, 354A, and 354B each have elongated portion, which extends in a lengthwise direction and upon which to connect an electrical connector of a branch device. The elongated portions of the branching first bus bars 352A and 352B are diagonally separated from each other and branch out from one end of the power line rail assembly 150; and the elongated portions of the second bus bars 354A and 354B are also diagonally separated from each other and branch out from the other end of the power line rail assembly 150. In this example, the first bus bar 352A branches out at a height, which is less than the height at which the first bus bar 352B branches out; the second bus bar 354A branches out at a height, which is less than the height at which the second bus bar 354B branches out.

The first bus bars 352A and 352B (or their elongated portions) and the second bus bars 354A and 354B (or their elongated portions) are separated from each other in an X-formation to provide first and second pairs of separated bus bars for each side, e.g., a Left side and a Right side, of the load center 100. In this example, the first pair of separated bus bars 352B and 354A has one of the first bus bars 352B positioned over one of the second bus bars 354A, the second pair of separated bus bars 352A and 354B has the other of the first bus bars 352A positioned under the other of the second bus bars 354B. The first and second bus bars 352A, 352B, 354A and 354B (or their elongated portions) are at least substantially parallel/parallel to each other.

As shown in FIG. 4, the power line rail assembly 150 can also include the enclosure 400 (e.g., housing, case, enclosure, etc.) for housing the conductors of the line bus bar assembly of the power line rail assembly 150. The enclosure 400 can be an insulation (or electrically insulated) enclosure, which can be formed of a dielectric or insulation material. The enclosure 400 includes first and second sets of windows on opposite sides of the enclosure 400 through which to connect or engage a connector from a device to the first and second pairs of bus bars 352B, 354A and 352A, 354B respectively in the enclosure 400. In this example, the first set of windows includes a top row of windows 450 ("top windows") for connecting to the first bus bar 352B and a bottom row of windows 452 ("bottom windows") for connecting to the second bus bar 354A of the first pair of bus bars. Although not shown in FIG. 4, the second set of windows on the opposite side of the enclosure 400 can have a similar or same/identical layout as the first set of windows. For example, the second set of windows also can include a top row of windows 450 for connecting to the second bus bar 354B and a bottom row of windows 452 for connecting to the first bus bar 352A of the second pair of bus bars.

The windows 450 and 452 of the first and second sets are arranged along a length of the enclosure 400. The windows 450 and 452 also can be finger-safe windows, which can have a size, shape and/or dimension to prevent an average adult sized finger from touching conductors of the assembly 150 through the window, but can allow a connector (e.g., a jaw connector or other electrical connector) of a device to connect to the conductors through the window.

In this example, the windows 450 and 452 of the first and second sets can have a spacing/pitch along a length of the enclosure 400, which can correspond to a spacing/pitch of the tracks 170 for each pole of a branch device connectable to the power line rail assembly 150. Each pair of windows 450 and 452 can thus be aligned and associated with a respective track 170 for receiving a pole of a branch device. Accordingly, the spacing/pitch of pairs of windows 450 and 452 and the tracks 170 along a lengthwise direction can be matched to the pole spacing of branch devices connectable to the power line rail assembly. In this way, branch devices (e.g., 190 and 192) can be connected to or disconnected from the power line rail assembly 150 in a safe and orderly fashion from both sides of the load center 100. The pitch/spacing of components can correspond to a distance from a center of one component to a center of the next or adjacent component.

Figure 5A:
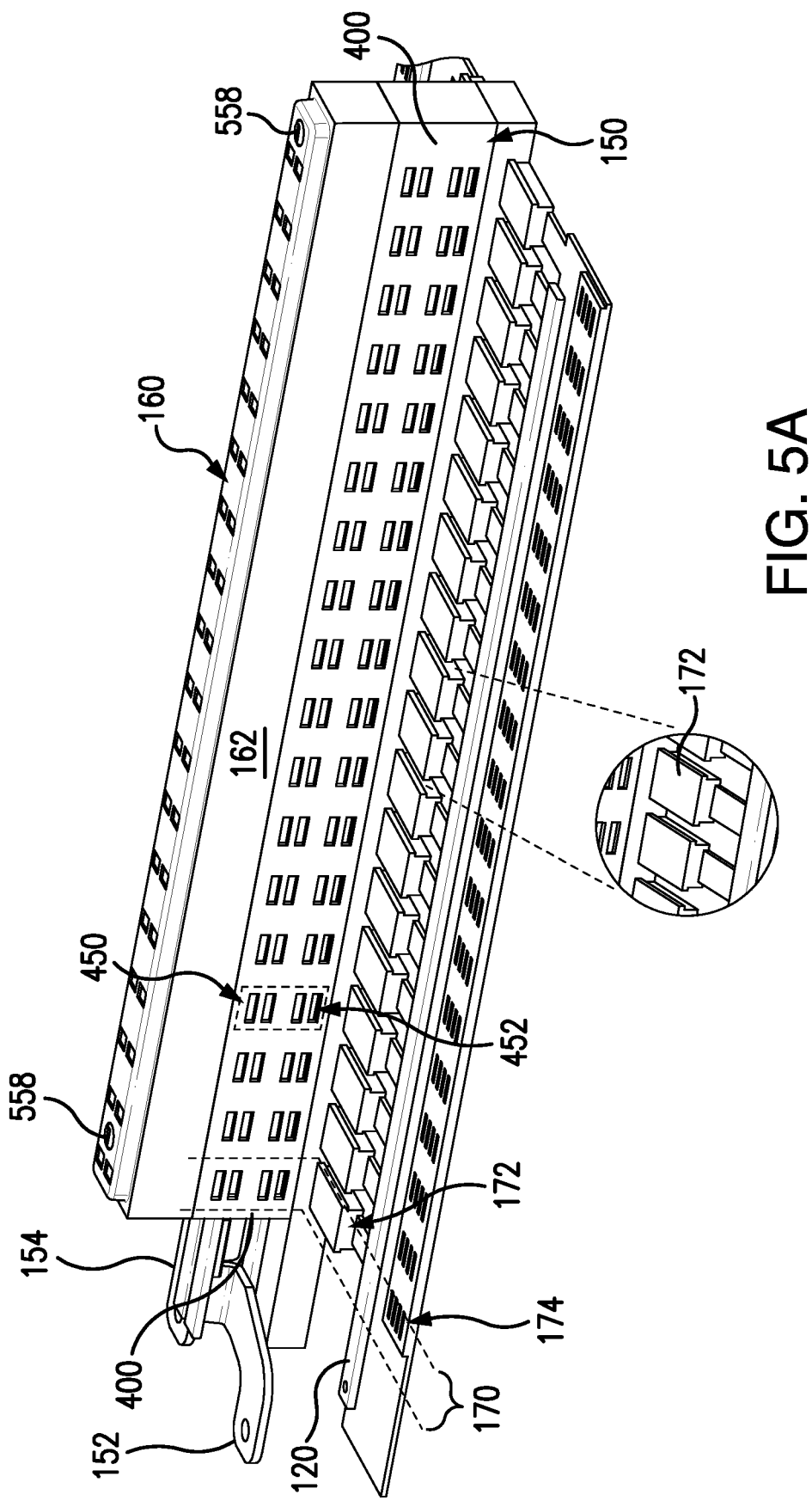
FIG. 5A shows a side perspective view of the power line rail assembly, electronic rail and tracks for branch devices, in accordance with an embodiment.
Figure 5B:
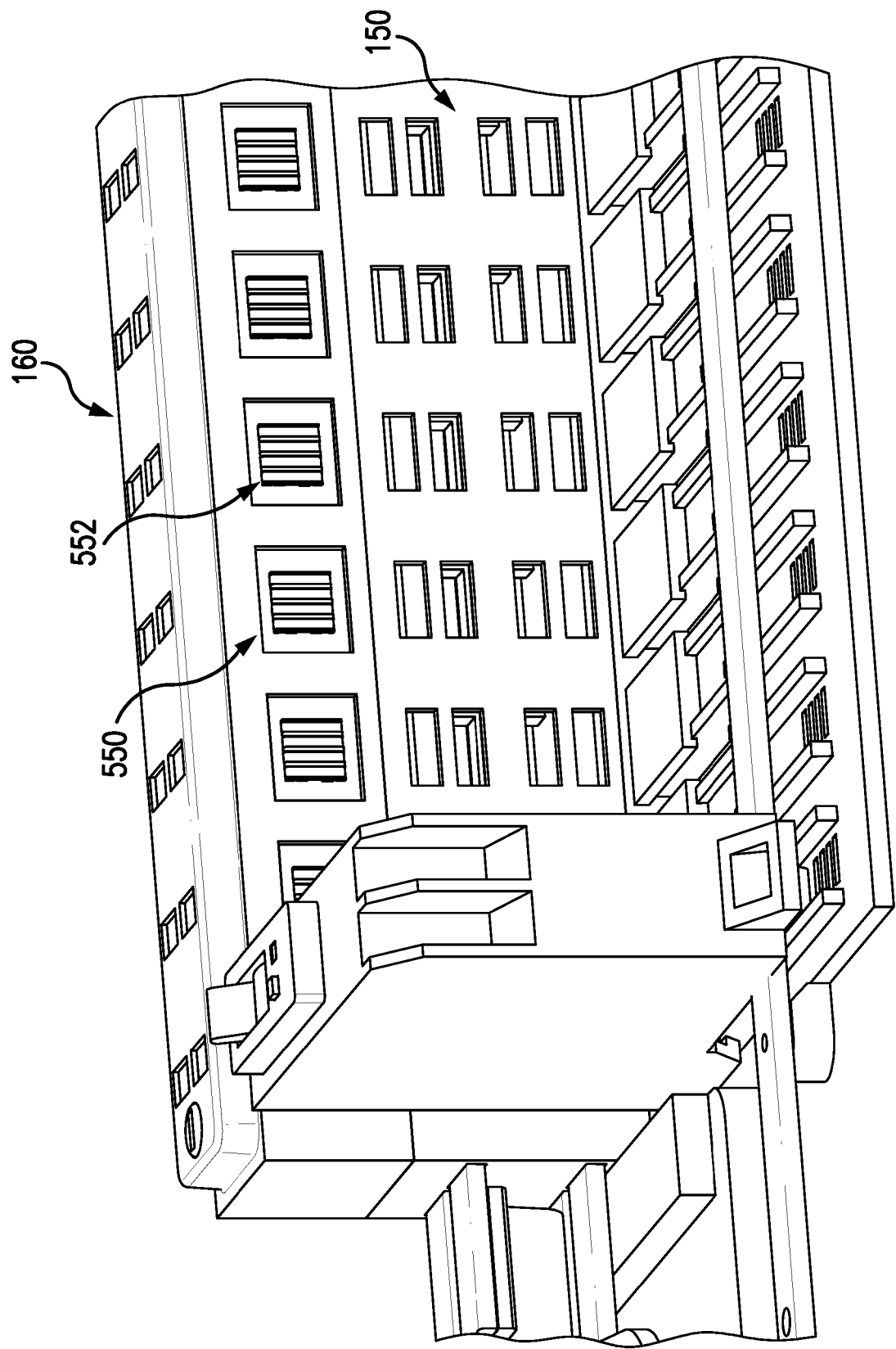
FIG. 5B shows an enlarged side perspective view of a portion of the power line rail assembly, electronic rail and tracks for branch devices, in accordance with an embodiment.

As further shown in FIG. 4, the enclosure 400 of the power line rail assembly 150 can include one or more fastener holes 458, e.g., at either ends of the enclosure, for securing the electronic rail 160 or its housing 162 to a top of the enclosure 400 using fastener(s) 558 such as screws as shown in FIG. 5A. Other types of fasteners or fastening systems can be used to secure the electronic rail 160 to the power line rail assembly 150. In this example, the top of the enclosure 400 can have a beveled edge (or border) so that the bottom of the housing 162 can sit on top of the enclosure 400. In some embodiments, as with windows (e.g., 450 and 452) of the enclosure 400, the housing 162 of the electronic rail 160 can also include spaced-apart windows 550, each with a communication port 552 (e.g., RJ-type port, USB port, etc.) as shown in FIG. 5B for enabling a branch device to connect its communication components to the electronic rail 160, via a communication connector (e.g., RJ-type connector, USB connector, etc.). The communication ports 552 may be spaced apart along the housing 162 to align with associated tracks 170 and associated pairs of windows 450 and 452, and thus, can also have a pitch spacing corresponding to pole-spacing of branch devices connectable to the load center 100. The pole-spacing (or pitch spacing) of a branch device can be a width or approximate width of the branch device, such as a width of circuit breakers (e.g., one-inch wide, 25 mm wide, or less). Pitch or spacing can be taken from a center line/axis of one device or component to a centerline of an adjacent device or component.

Furthermore, as shown in FIG. 5A, each of the plurality of tracks 170 on opposite sides of the power line rail assembly 150 can include a guide rail 172 and teeth/slots 174. Each guide rail 172 can have a dove tail cross-section for engaging and guiding each pole of a branch device thereon along a horizontal direction. In this way, a branch device can be inserted onto the guide rail 172 to slide towards or away from the power line rail assembly 150 and the electronic rail 160.

Figure 6B:
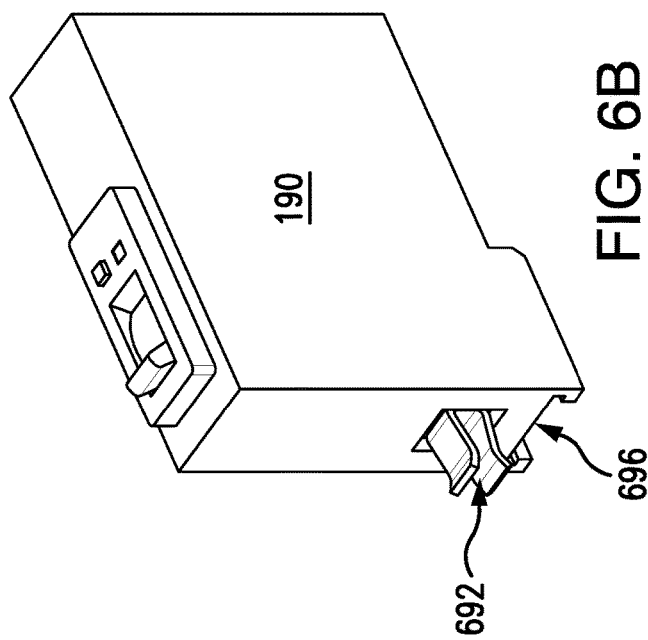
FIGS. 6A, 6B, and 6C show an example one-pole branch device with horizontal line and neutral connectors, in accordance with an embodiment.
Figure 6C:
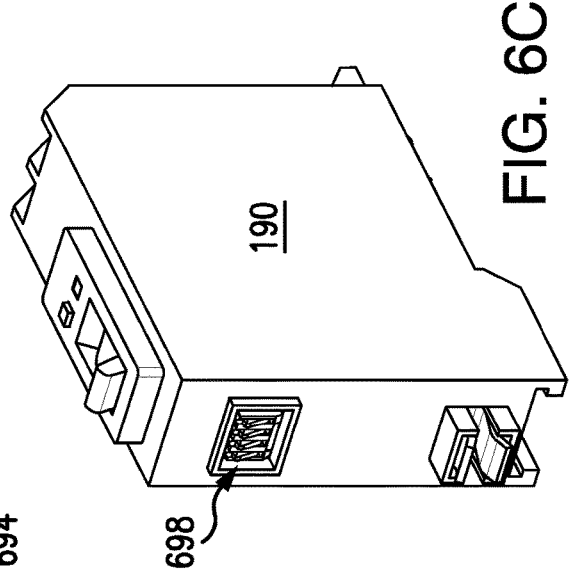
Figure 6A:
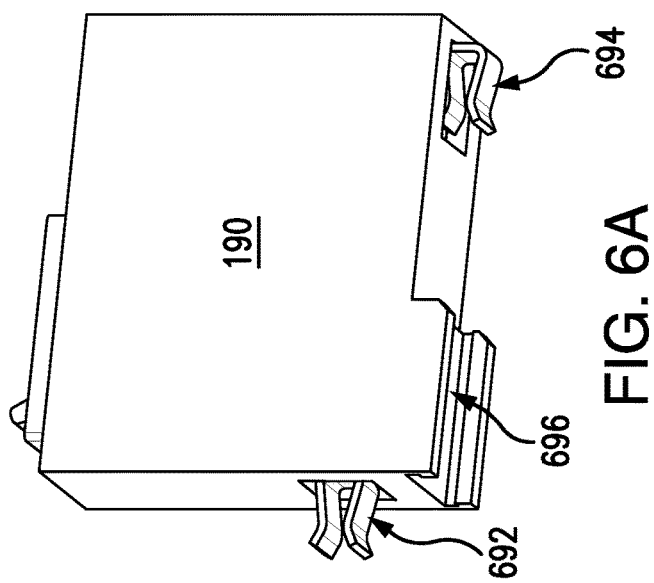

FIGS. 6A, 6B and 6C show an example one-pole branch device 190 with a horizontal line connector 692 for horizontally connecting to a conductor of a line bus and a horizontal neutral connector 694 for horizontally connecting to the neutral bus 120, and a communication connector 698 to connect to the electronics rail 160. The horizontal line connector 692 can be configured with a desired height to connect to a conductor of a line bus through a top window 450 or bottom window 452 of the power line rail assembly 150 of FIGS. 4 and 5. The branch device 190 can include a grooved bottom portion 696, which has a size and shape to engage and slide along the guide rail 172 of one of the tracks 170 in a horizontal direction. In this example, the portion 696 can have a groove with a dove-tail cross-sectional shape, and the line and neutral connectors 692, 694 can be jaw-type connectors. In some embodiments, the one-pole branch device 190 can have a width of about 25 mm.

Figure 7B:
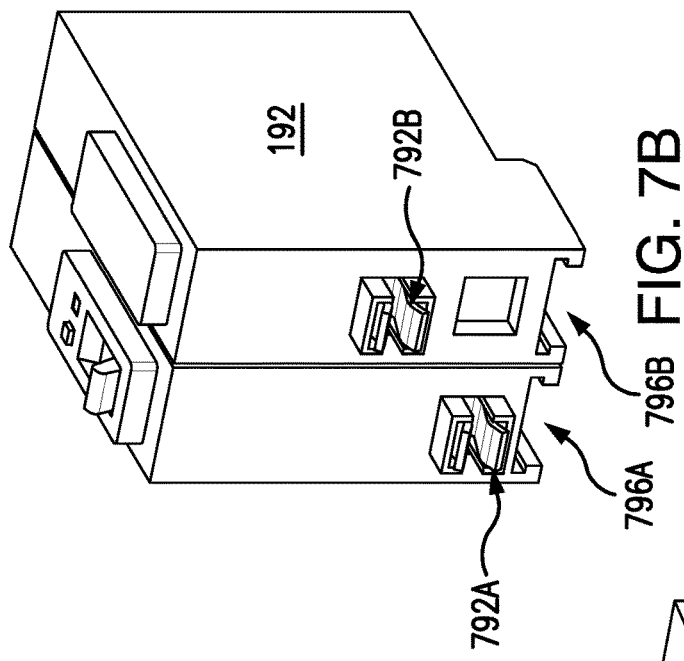
FIGS. 7A, 7B, and 7C show an example two-pole branch device with two sets of horizontal line and neutral connectors for each pole, in accordance with an embodiment.
Figure 7A:
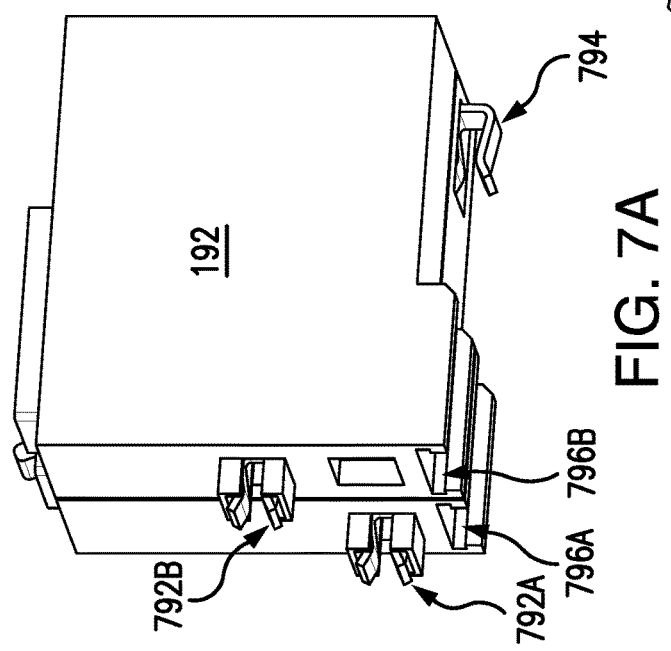
Figure 7C:
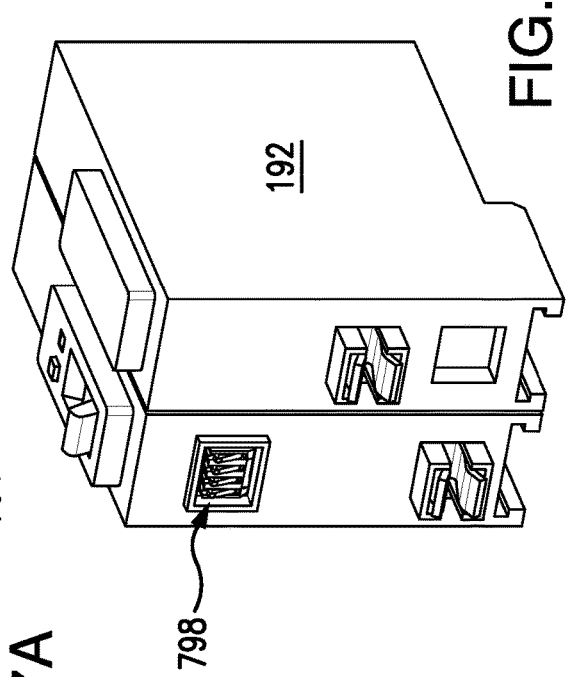

FIGS. 7A, 7B and 7C show an example two-pole branch device 192 with two sets of horizontal line and neutral connectors for each pole, and a communication connector 798 to connect to the electronics rail 160, in accordance with an embodiment. As shown, the branch device 192 has a first set of horizontal line and neutral connectors 792A and 794A respectively for a first pole, and a second set of horizontal line and neutral connectors 792B and 794B respectively for a second pole. The horizontal line connector 792A has a height or position to connect to a bottom window 452 of the enclosure 400 (e.g., in FIG. 4), and the horizontal line connector 792B has a height or position to connect to a top window 450 of the enclosure. The branch device 192 also includes grooved bottom portions 796A and 796B for the first and second poles respectively. Each of the grooved bottom portions 796A, 796B has a size and shape to engage and slide along a guide rail 172 of one of the tracks 170 in a horizontal direction. In this example, the portion 796A, 796B can have a groove with a dove-tail cross-sectional shape, and the line and neutral connectors 792A/B, 794A/B can be jaw-type connectors. In some embodiments, each pole of the branch device 192 can have a width of about 25 mm.

Figure 8:
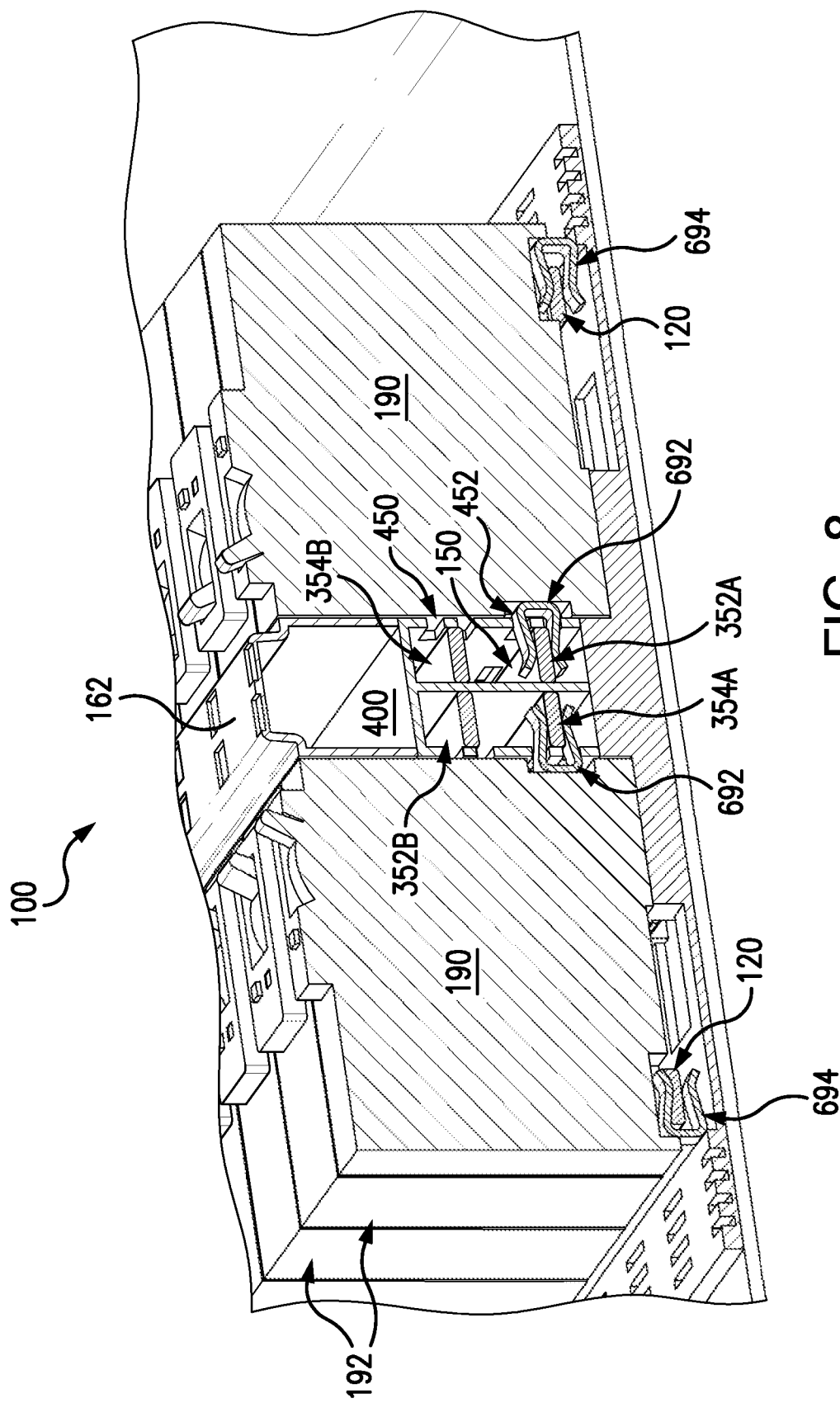
FIG. 8 shows a cross-sectional view of the load center of FIGS. 1 and 2, including the power rail bus assembly and branch devices connected thereto in accordance with an embodiment.

FIG. 8 shows a cross-sectional view of the load center 100 of FIGS. 1 and 2, including the power rail bus assembly 150 and branch devices (e.g., 190 and 192) connected thereto in accordance with an embodiment. As shown in FIG. 8, the branching first bus bars 352A and 352B and branching second bus bars 354A and 354B of the first and second line buses 152 and 154, respectively, are arranged in an X-formation to provide first and second pairs of separated bus bars for each side, e.g., a Left side and a Right side, of the load center 100. As previously discussed, the first pair of separated bus bars 352B and 354A has one of the first bus bars 352B positioned above one of the second bus bars 354A, the second pair of separated bus bars 352A and 354B has the other of the first bus bars 352A positioned below the other of the second bus bars 354B.

In this example of FIG. 8, a one-pole branch device 190 is arranged on a track 170 on a Left side of the load center 100, and has its line connector 692 connected to the second bus bar 354A of the second line bus 154 through a bottom window 452 of the enclosure 400 and its neutral connector 694 connected to the neutral bus 120. On the opposite side, another one-pole branch device 190 is arranged on a track 170 on a Right side of the load center 100, and has its line connector 692 connected to the first bus bar 352A of the first line bus 152 through a bottom window 452 of the enclosure 400 and its neutral connector 694 connected to the neutral bus 120. The above describes an example in which a one-pole branch device can be connected to either the first line bus 152 or second line bus 154 of the power line rail assembly 150 from either sides of the load center 100. In some embodiments, a two-pole branch device 192 (e.g., in FIG. 7) can be arranged on adjacent two tracks 170, with the line connector of one-pole connected to the bus bar 352B through a top window 450 and the line connector of the second pole connected to the bus bar 354A through a bottom window 452. In this way, the branch device 192 and its branch circuit can be supplied with the combined voltage from the first and second line buses 152 and 154, respectively.

FIGS. 9A, 9B, 9C and 9D show different views of a one-pole branch device 190 (e.g., in FIGS. 6A, 6B and 8) with a circuit breaker ratchet lock assembly, in accordance with an embodiment. In this example, the branch device 190 incorporates components of a ratchet lock for locking the branch device 190 into a track 170 when the line and neutral connectors 692, 694 are connected to a conductor on the power line rail assembly 150 and the neutral bus 120, respectively. As shown in FIGS. 9A and 9B, the branch device 190 can include a bracket 900 for retaining a spring-loaded pawl (or lever), which can pivot along an axis and can be spring-loaded so a tip (or open-end) of the pawl 910 is pointing downwards in a resting position. The bracket 900 also includes a space (or opening) 902 between the pawl 910 and a back wall of the branch device 190 or bracket 900. After the branch device 190 is arranged on one of the tracks 170 with its line connector 692 connected to a conductor on the power line rail assembly 150 (through a window) and its neutral connector 694 connected to the neutral bus 120, the pawl 910 can be engaged to one of the teeth/slots 174 on the track 170 as shown in FIGS. 9C and 9D in order to lock the branch device 190 between the track 170 and the power line rail assembly 150. The ratchet lock assembly, as described herein, may also be employed with multi-pole branch devices which can include one pawl or a pawl for each pole.

Figure 10A:
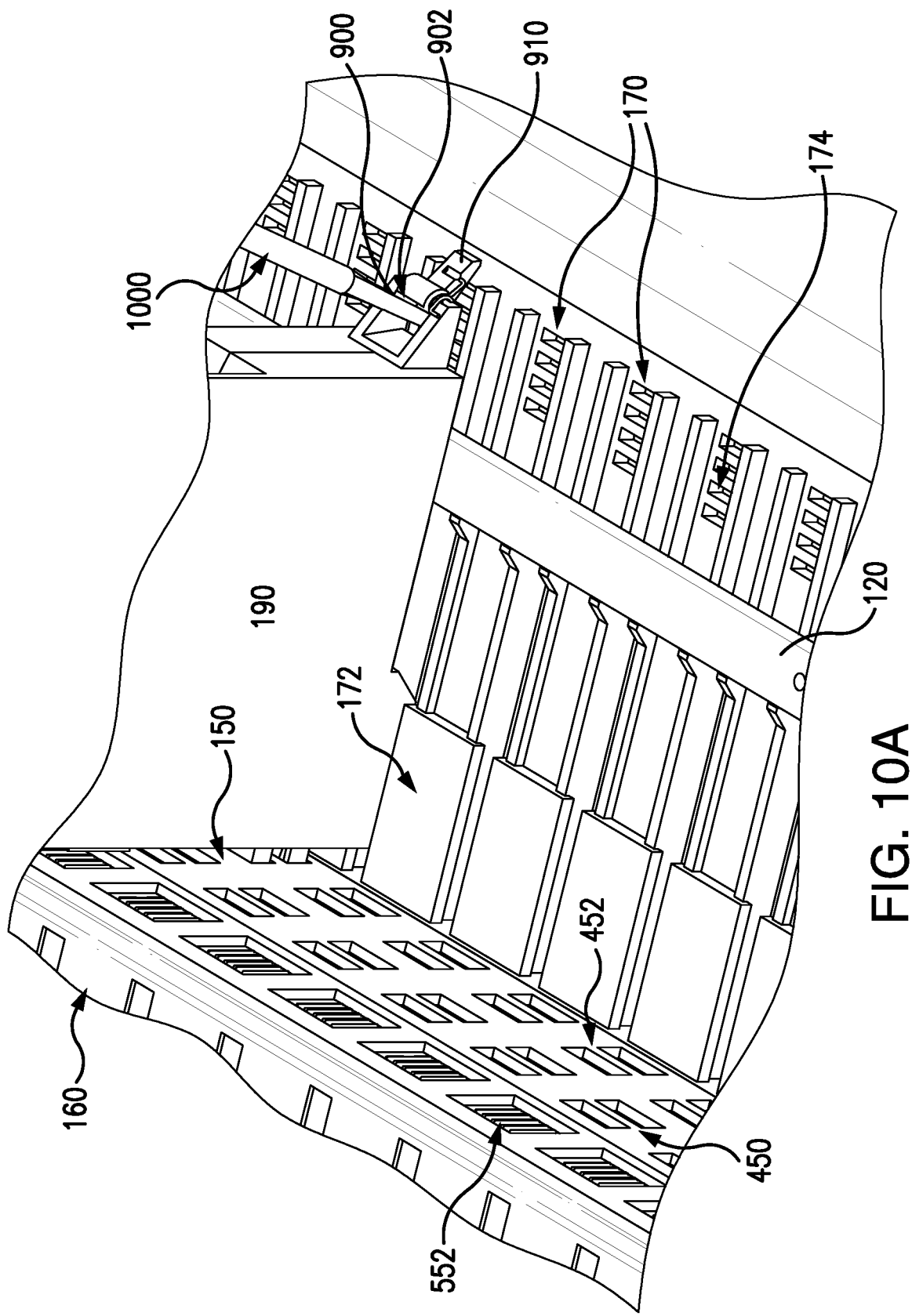
FIGS. 10A, 10B and 10C show an example of how to rack-in and rack-out a branch device on a track to or from the power line rail assembly of the load center of FIGS. 1 and 2, in accordance with an embodiment.
Figure 10B:
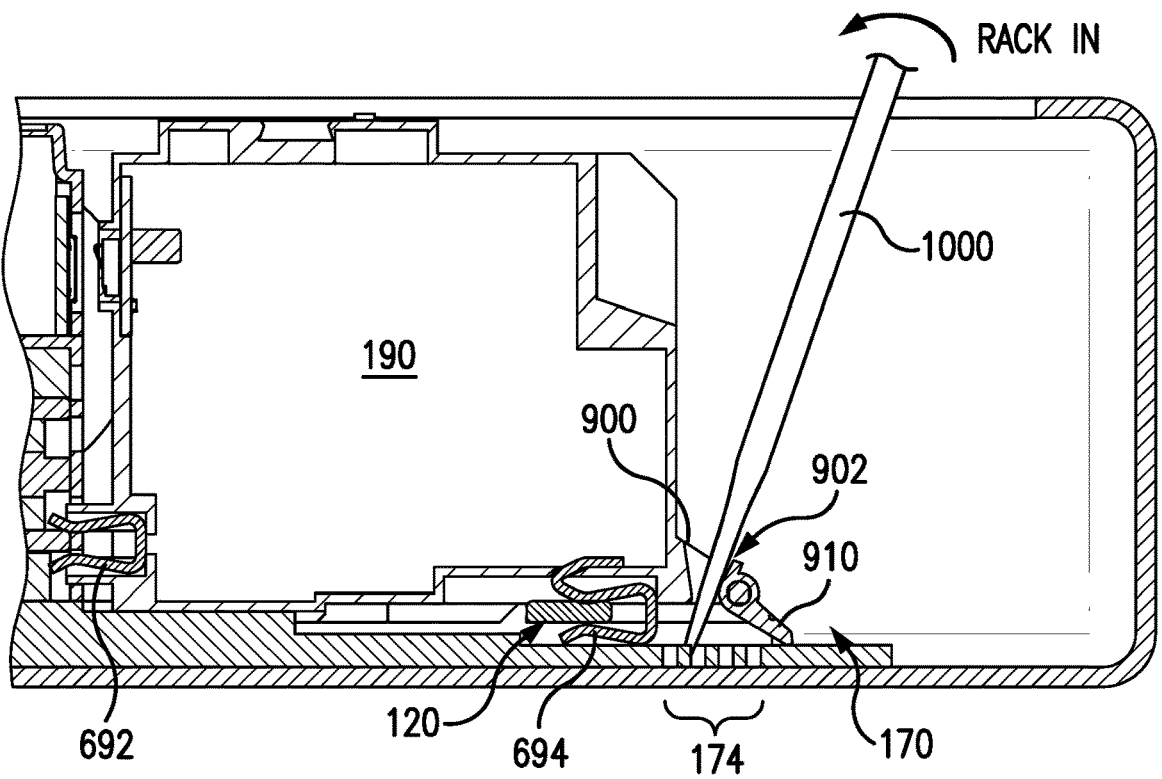
Figure 10C:
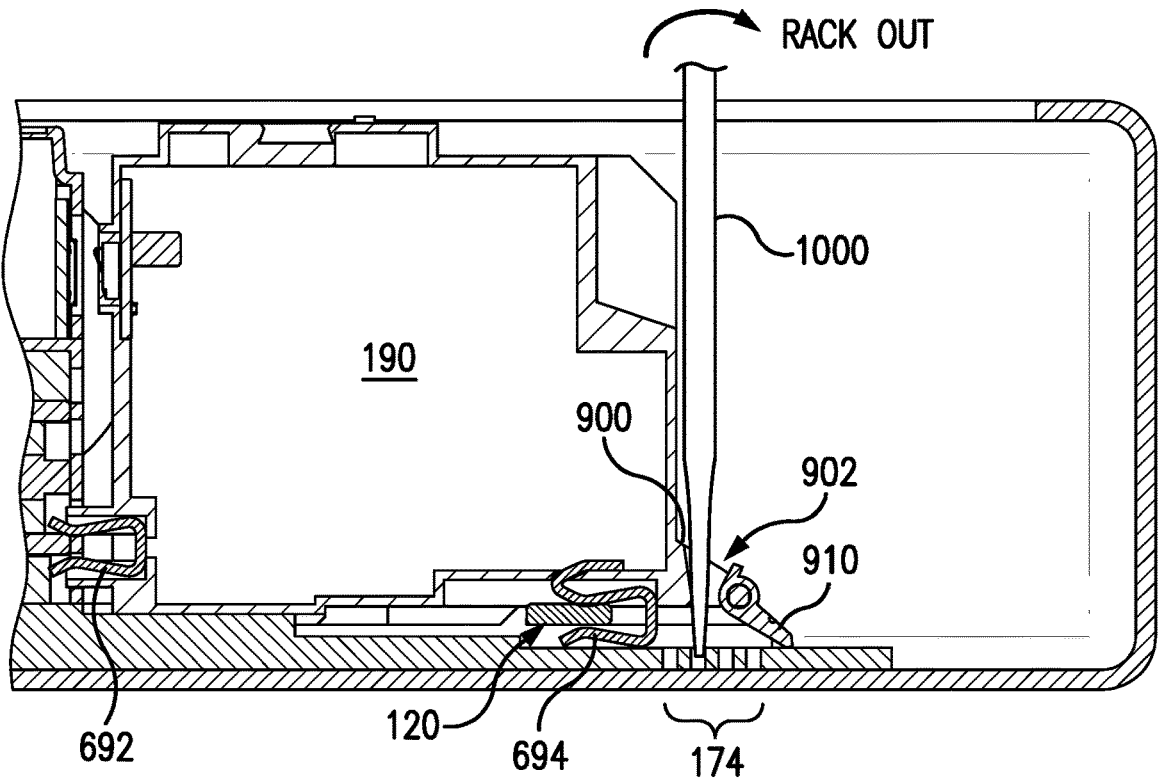

FIGS. 10A, 10B and 10C show an example of how to rack-in and rack-out a branch device (e.g., device 190 of FIG. 6) on a track 170 from the power line rail assembly 150 of the load center 100 of FIGS. 1 and 2, in accordance with an embodiment. As shown in FIG. 10A, each pole of the branch device 190, which in this example is a single-pole device, can be inserted onto a track 170 to move along the guide rail 172 of the track 170. As previously discussed, the bottom groove 696 of the branch device 190 can be movably engaged to the guide rail 172 of the track 170.

A flat screwdriver or similar tool 1000 can be extended through the space 902 of the bracket 900 of the branch device 190 to engage one of teeth/slots 174 of the track 170. The tool 1000 can be manipulated in one direction as shown in FIG. 10B to rack-in the branch device 190 to connect the line connector 692 to a conductor of the power line rail assembly 150 (via a window 450 or 452) and the neutral connector 694 to the neutral bus 120. When the branch device 190 is racked-in, a communication connector (e.g., 698 in FIG. 6C or 798 in FIG. 7C) of the branch device 190 can also be connected to a corresponding communication port 552 on the electronic rail 160 for facilitating communication between branch device(s) and other devices/systems.

The tool 1000 can be manipulated in the other direction as shown in FIG. 10C to rack-out the branch device 190 to disconnect the line connector 692 from a conductor of the power line rail assembly (via a window 450 or 452), the neutral connector 694 to the neutral bus 120, and other component(s) of the branch device 190 from the load center 100. Accordingly, the load center 100 provides a power line bus assembly 150, and if desired, an electronic rail 160 along a center line or axis, which can allow branch devices (and their connectors) to be easily racked-in to and racked out from the conductors and communication components of the load center 100. The load center 100 also provides a track system with a ratchet lock assembly as well as finger-safe protection, which can facilitate the connection and disconnection of branch devices in an orderly and safe manner on the load center 100.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

I claim:

1. A power line rail assembly for an electrical distribution system, comprising:
 a line bus bar assembly for supplying electrical energy, the line bus bar assembly having conductors including a first line bus and a separate second line bus, the first line bus including two branching first bus bars, the second line bus including two branching second bus bars, wherein the first and second bus bars are separated from each other in an X-formation along a length of the line bus bar assembly to provide first and second pairs of separated bus bars, the first pair of separated bus bars having one of the first bus bars positioned above one of the second bus bars, the second pair of separated bus bars having the other of the first bus bars positioned below the other of the second bus bars; and
 an enclosure for housing conductors of the line bus bar assembly, the enclosure including first and second sets of windows on opposite sides of the enclosure through which to connect to the first and second pairs of bus bars respectively in the enclosure,
 each of the first and second sets of windows having a top row of windows and a bottom row of windows, the top and bottom rows arranged along a length of the enclosure,
 the top row of windows of the first set for connecting to one of the first and second bus bars of the first pair of separated bus bars, the bottom row of windows of the first set for connecting to the other of the first and second bus bars of the first pair of separated bus bars,
 the top row of windows of the second set for connecting to one of the first and second bus bars of the second pair of separated bus bars, the bottom row of windows of the second set for connecting to the other of the first and second bus bars of the second pair of separated bus bars.

2. The power line rail assembly of claim 1, wherein the branching first and second bus bars each have an elongated portion which extends along a direction of a length of the enclosure and upon which to connect an electrical connector of a branch device through a window from the first or second set.

3. The power line rail assembly of claim 2, wherein the elongated portions of the two branching first bus bars are separated diagonally from each other along a length of the enclosure, and the elongated portions of the two branching second bus bars are separated diagonally from each other along a length of the enclosure.

4. The power line rail assembly of claim 2, wherein the elongated portion of the first bus bar of the first pair of bus bars is at least substantially parallel to the second bus bar of the second pair of bus bars, and the elongated portion of the first bus bar of the second pair of bus bars is at least substantially parallel to the second bus bar of the first pair of bus bars.

5. The power line rail assembly of claim 1, wherein the line bus bar assembly has a first end and a second opposite end, the two branching first bus bars branch out from the first end of the line bus bar assembly, and the two branching second bus bars branch out from the second end of the line bus bar assembly.

6. The power line rail assembly of claim 1, wherein the first and second line buses supply voltage at first and second voltages respectively, the line bus bar assembly being configured to supply voltage substantially equal to the sum of the first and second voltages when a 2-pole branch device has a first pole connected to the first line bus and a second pole connected to the second line bus, from a window from one of the top and bottom rows and a window from the other of the top and bottom rows respectively on the first or second set.

7. The power line rail assembly of claim 1, wherein the rows of each of the first and second sets on respective sides of the enclosure have their windows spaced apart according to a pole-spacing of branch devices connectable thereto.

8. The power line rail assembly of claim 1, wherein the first and second line buses are electrically isolated from each other by dielectric or insulation walls in the enclosure.

9. The power line rail assembly of claim 1, wherein the windows of the enclosure are finger-safe windows.

10. A load center comprising:
 two neutral buses; and
 a power line rail assembly of claim 1 which is arranged between the two neutral buses.

11. The load center of claim 10, further comprising:
a plurality of tracks each having a guide rail for guiding a branch device to connect to the first or second line bus through a window of a corresponding top and bottom window pair from the top and bottom rows of windows along the enclosure of the power line rail assembly, the tracks and respective window pairs being spaced apart along the enclosure according to pole-spacing of branch devices connectable thereto.

12. The load center of claim 11, further comprising at least one branch device having a horizontal line connector for connecting to one of the first and second bus bars through a window from a top and bottom window pair from the top and bottom rows of windows along the enclosure of the power line rail assembly.

13. The load center of claim 12, wherein the at least one branch device further includes a horizontal neutral connector, the at least one branch device configured to connect or disconnect the neutral and line connectors to or from the neutral bus bar and one of the first and second bus bars, respectively, when racking in or racking out the at least one branch device along a track from the plurality of tracks.

14. The load center of claim 12, wherein the at least one branch device further includes a spring-loaded pawl for engaging a tooth or slot on a track from the plurality of tracks to lock the at least one branch device between the power line rail assembly and the track after the at least one branch device is connected to the power line rail assembly in a racked-in position.

15. The load center of claim 10, wherein the enclosure of the power line rail assembly has a substantially rectangular shape with the first and second sets of windows being located along a length of the enclosure of the power line rail assembly on opposite sides thereof.

16. The load center of claim 10, further comprising an electronic rail configured to enable communications for one or more branch devices connected to branch circuits powered by the first and/or second bus bars, the electronic rail being connected on top of the enclosure of the power line rail assembly.

17. The load center of claim 16, further comprising at least one branch device having a horizontal line connector for connecting to one of the first and second bus bars through a window from a top and bottom window pair from the top and bottom rows of windows along the enclosure of the power line rail assembly, the at least one branch device further including a communication connector for connecting to a communication port of the electronic rail in a horizontal direction.

18. The load center of claim 10, further comprising:
an electronic rail configured to enable communications for one or more branch devices connected to branch circuits powered by the first and/or second bus bars, the electronic rail being connected on top of the enclosure of the power line rail assembly, the electronic rail including a row of communication ports arranged along a length of the electronic rail;
at least one branch device having a horizontal line connector for connecting to one of the first and second bus bars through a window from a top and bottom window pair from the top and bottom rows of windows along the enclosure of the power line rail assembly, and a communication connector for connecting to a communication port from the row of communication ports on the electronic rail; and
a plurality of tracks each having a guide rail for guiding the at least one branch device to connect to the first or second line bus through a window of a corresponding top and bottom window pair from the top and bottom rows of windows along the enclosure of the power line rail assembly and to connect to a communication port from the row of communication ports on the electronic rail,
wherein the tracks, respective window pairs and communication ports are spaced apart along the enclosure according to pole-spacing of branch devices connectable thereto.

* * * * *